April 11, 1950  D. SILVERMAN ET AL  2,503,423
PENDULUM SYSTEM FOR GRADE-ANGLE MEASUREMENTS
Filed July 26, 1947  2 Sheets-Sheet 1
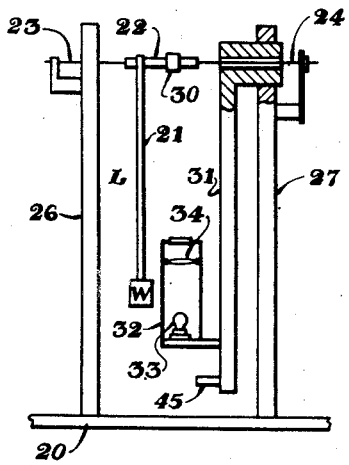
*Fig. 2*
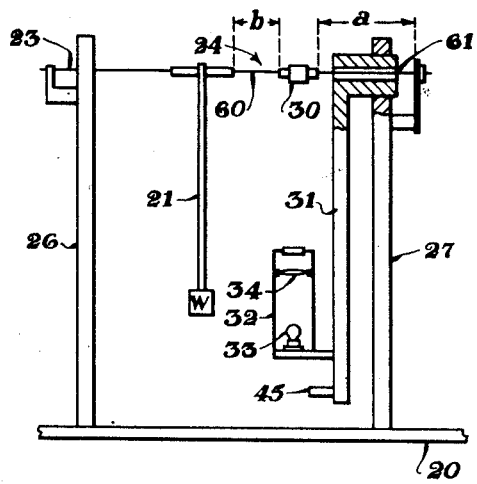
*Fig. 4*
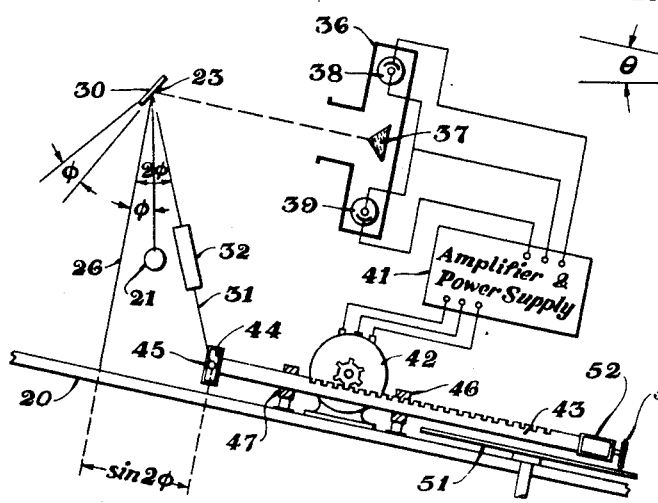
*Fig. 1*
*Fig. 3*
Daniel Silverman
Joseph D. Eisler
Julian F. Evans
INVENTORS
BY *Newell Pottoff*
ATTORNEY Patented Apr. 11, 1950

2,503,423

UNITED STATES PATENT OFFICE 2,503,423

PENDULUM SYSTEM FOR GRADE-ANGLE MEASUREMENTS

Daniel Silverman, Joseph D. Eisler, and Julian F. Evans, Tulsa, Okla., assignors to Stanolind Oil and Gas Company, Tulsa, Okla., a corporation of Delaware Application July 26, 1947, Serial No. 763,864

2 Claims. (Cl. 33—215)

This invention relates to the art of topographic surveying and is directed particularly to an elevation-surveying instrument of the gravity-pendulum type, which continuously indicates the elevations along a traverse over which it is transported by a vehicle. Specifically, the invention comprises a method and means for very accurately and continuously forming the integral of the distance increments traveled along a path times the sine of the angle between each such increment and the horizontal. This, as is well known, gives the elevation along the path.

In elevation meters of this type which employ a pendulum as a reference for the continuous measurement of the grade angle and means for introducing the sine of this angle into the integral-computing mechanism, notable improvements in accuracy have been achieved by suspending the pendulum between horizontal torsion fibers and by observing its motion relative to the vehicle with a follower mechanism that is non-reactive, imposing no load whatever on the pendulum. The torsion-fiber suspension appears to introduce even less friction than the most delicate jeweled pivots or anti-friction bearings, while friction in the follower system has no effect on the pendulum position because of the complete absence of reaction of the follower on the pendulum. An example of an elevation meter embodying these features is shown by Figure 3 of United States Patent 2,362,616 to R. T. Cloud.

While inaccuracy due to frictional effects has been largely eliminated by these two expedients, each of them, however, introduces certain additional complications. In its preferred form the follower mechanism includes a light source, a mirror mounted on and rotated by the pendulum, and fixed photocells. The light source is mounted on a follower arm which pivots concentrically with the pendulum which arm is driven by a motor so controlled from the photocells as to keep the light beam reflected from the pendulum mirror directed toward the photocells; that is, in a constant direction with reference to the transporting vehicle. In an optical system of this type when the pendulum and mirror rotate through a given angle, the lamp or follower arm must rotate through twice this angle in order to keep the light beam directed toward the fixed photocells. Obviously, the relative locations of the lamp and the photocells can be interchanged without altering this principle of operation of the system. It is from this double-angle motion of the follower arm or some component of it that the sine of the angle between the road and the horizontal is to be derived.

This would cause no difficulty if the sine of an angle and the sine of the angle doubled were proportional to each other. However, the range of angles where this is true, at least with the precision ordinarily desired for accurate surveying, is extremely limited. Only from 0° to about 2° or 3° may the sine of the double angle be substituted for the sine of the angle, using .50 as the proportionality constant; above about 3° this angle-doubling error is appreciable. In fact, at 10° or 15° it is quite large and increases rapidly at larger angles.

Another complication, which arises from the torsion of the pendulum-suspending fibers, in a sense adds to the difficulty of correcting for the error from angle-doubling, although both effects operate independently. Due to the torque exerted on the pendulum by its suspending fibers, the angle assumed by the pendulum with reference to its support is always less than the angle between the road and the horizontal. In other words, the angle which is doubled by the follower arm is not even the road angle, but is something smaller than it. This torsion error can be kept fairly small by employing relatively weak fibers which exert only a small restoring force on the deflected pendulum. Further, the range of angles where the sine of a double angle may be substituted for the sine of the angle can be extended slightly by using a proportionality constant greater than .50. This introduces some error at small grade angles, but there are many fairly level areas which may be satisfactorily surveyed with an instrument embodying such compromises. For the most accurate surveying and for the surveying of rough terrain, however, some additional means of correcting for errors from these two sources is clearly necessary.

It is accordingly a primary object of this invention to provide, in an elevation-measuring instrument of the type employing a torsionally suspended pendulum and an angle-doubling follower system, an integral-computing mechanism of greatly improved accuracy. Another object of the invention is to extend the range of angles to which such an instrument is accurately responsive so that surveys may be accurately carried out over rough terrain. It is a further object of this invention to provide means for improving the accuracy of integral computation, and specifically means for very accurately taking the sine of the grade angle, which are simple to apply and do not greatly complicate the instrument construction. A still further object of this invention is to provide, for elevation meters of this type, an integral computation mechanism which is accurate both at small and at quite large angles of grade. Other objects, uses, and advantages of this invention will become apparent as this description proceeds.

Briefly, the essence of this invention by which the foregoing and other objects are accomplished comprises adjusting the angle of rotation of the pendulum-actuated mirror. For pendulum suspension systems which have been designed to have as large a pendulum deflection as practical for a given grade angle, this adjustment takes the form of a reduction of the mirror angle. Improvement occurs for mirror angle reductions all the way to a point where the mirror angle is somewhat less than half the corresponding grade angle. For example, if the mirror angle is made approximately one-half the grade angle, when the moving follower arm then doubles the mirror angle in maintaining the light beam focused on the fixed photocell, the follower arm swings through approximately the grade angle. It has been found further that, by proper choice of pendulum and suspending fiber constants so that a certain relation obtains between them, the tendency of the fiber torsion to introduce an error can be made to offset or cancel exactly over a quite large angular range the introduction of an error by angle-doubling in the optical follower system. Also, it has been found that where the angle of rotation of the mirror is a constant fraction of the pendulum-deflection angle and is made equal to one-half the true grade angle for a given value, say, for a grade angle of 10°, then it continues to be very accurately one-half of the grade angle over a very large angular range. The angle-doubling of the optical follower system then produces no error.

The principles and operation of the invention will be better understood by reference to the accompanying drawings forming a part of this application, and wherein the same reference numerals are applied to the same or corresponding parts in the different figures. In these drawings:

Figure 1 is a diagrammatic representation of a torsionally suspended pendulum mounted on a vehicle for transportation along a traverse;

Figure 2 is a view in elevation of a torsion-fiber-suspended pendulum and follower-arm mounting embodying one form of the invention;

Figure 3 is a view partly diagrammatic of a pendulum and follower system showing the relationship of various angles and the coupling to the integration mechanism of an elevation meter;

Figure 4 is a view in elevation of a torsion-fiber pendulum suspension and follower-arm system comprising an alternative embodiment of the invention.

Figure 5:
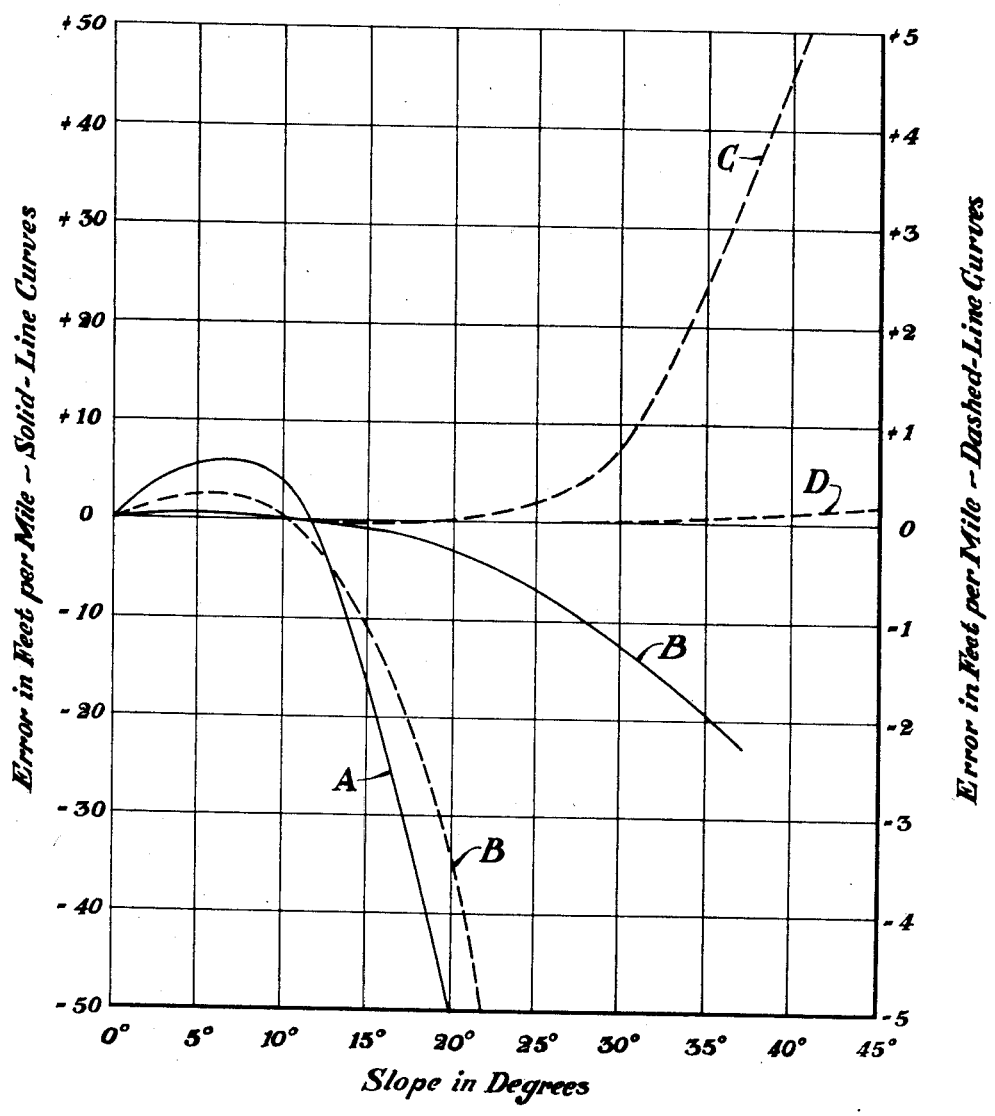
Figure 5 is a graph, the several curves of which represent the errors of integration as functions of grade angle under various conditions or methods of correction.

Referring now to the drawings, Figures 1 and 2 show the essential details of a pendulum system employing a torsion suspension fiber, to which system the invention is applicable. A vehicle 20 carries a pendulum 21 along a traverse inclined, for example, at an angle $\theta$. Pendulum 21, of weight $W$ and length $L$, is mounted on a horizontal spindle 22 between a pair of torsion fibers 23 and 24, the ends of which are fixed to the upright posts or supports 26 and 27 carried by vehicle 20. As is shown in Figure 1, due to the torque of fibers 23 and 24 acting on it, pendulum 21 hangs at an angle $\phi$ with respect to support 26, which is less than the grade angle $\theta$. Letting $T$ represent the restoring torque exerted on the pendulum per unit angular twist of these fibers, an expression for $\theta$ as a function of $\phi$ can be determined readily from the torque equation $$WL \sin (\theta - \phi) = T\phi \quad (1)$$

obtaining $$\theta = \phi + \sin^{-1} \frac{T}{WL}\phi \quad (2)$$

On the other hand, as no correspondingly simple expression for $\phi$ as a function of $\theta$ exists, in order to study the relation of these angles under various conditions, it is necessary to assume values of $\phi$ and work backwards to determine the corresponding values of $\theta$. With regard to units of measurement of $T$, $W$, and $L$, since it is always the ratio $T/WL$ which is of primary interest in this invention, it is necessary only that $T$ and $WL$ be in the same units. That is, if $W$ is in pounds and $L$ is in inches, $T$ is to be expressed or measured in pound-inches. No particular system of units is essential to make Equations 1 and 2 true equalities.

The non-reactive system for following the motion of pendulum 21 and obtaining from it a sine function is shown in Figures 2 and 3. On the spindle 22 of the pendulum is fixed a small mirror 30 which therefore moves with the pendulum. A follower arm 31 pivoted to support 27 concentrically with fiber 24 carries a housing 32 in which are a light source 33 and a focusing or condensing lens 34. The light beam from source 33 is reflected by mirror 30 to a fixed housing 36 containing a beam-splitting, silvered prism 37, which divides the light between and directs it to photocells 38 and 39. An amplifier and power supply 41, which may be of any conventional type, utilizes the output of these photocells to control the operation of a reversible motor 42, which moves a rack 43 having a transverse slot 44 in which slides a horizontal pin 45 on follower arm 31. Suitable guides 46 and 47 constrain rack 43 to a linear motion perpendicular to the direction assumed by arm 31 for zero grade angle, slot 44 being parallel to this arm direction.

In operation, when mirror 30 rotates with pendulum 21 and shifts the light beam so that the photocells are unequally illuminated, motor 42 is energized to shift rack 43 and move follower arm 31 in a direction to center the light beam again on prism 37. As the pendulum angle relative to the support 26 is the angle $\phi$, it is clear that the follower-arm rotation is $2\phi$. Since the effect of the cooperation of slot 44 and pin 45 is to derive from the follower arm only that component of its motion perpendicular to its zero-grade-angle position, the motion of rack 43 is therefore proportional to $\sin 2\phi$.

The actual computation of the integral of the product of the grade angle sine times the distance traveled is performed by a friction wheel 50 mounted on the rack 43, the edge of the wheel 50 being in contact with a flat disk 51 which is rotated according to the distance traveled. A counter or indicator 52 connected to the wheel 50 is thus driven proportional to $\sin 2\phi$ times the distance traveled, its total reading representing the desired integral or summation.

In an elevation meter constructed according to this design, it was found by actual measurement that the relation between the road angle $\theta$ and the pendulum angle $\phi$ could be expressed by the equation $$\theta = \phi + \sin^{-1} .00244\phi \quad (3)$$

$\theta$ and $\phi$ being in degrees rather than radians.

Arbitrarily assuming a proportionality constant to make the desired sin θ and the actual sin 2φ provided by the instrument exactly equal at φ=10° (θ=11.4°), the error in feet of elevation per mile of traverse due to integrating with sin 2φ instead of sin θ has been computed for a range of grade angles possible in rough terrain.

Curve A of Figure 5, plotted to the ordinates on the left of the drawing, shows how this error varies with the grade angle for slopes from 0° up to about 20° where it reaches a value of nearly 50 feet per mile. At angles greater than 20° the error increases even more rapidly than on the illustrated portion of this curve. This clearly is too large to be tolerated for any kind of very accurate surveying.

In accordance with this invention the error shown by curve A is reduced both for small and for fairly large angles to an extent satisfactory for most purposes by decreasing or adjusting the deflection angle φ of the pendulum and mirror, preferably to approximately one-half the grade angle θ. This may be regarded as increasing or adjusting the value of T/WL in Equation 2, which may be accomplished by adjustment of any one or more of the parameters T, W, or L; for example, by employing stiffer fibers, thus increasing T for the system. Or, if preferred, the same result can be attained by decreasing the effective weight W or effective length L of the suspended pendulum. In terms of Equation 2, this amounts to increasing the constant T/WL=.00244 of Equation 3 to the value T/WL=.01745, for which value it will be seen that φ, the mirror (or the pendulum) angle, is approximately one-half the grade angle θ. For example, upon substituting this value .01745 for T/WL in Equation 2, solving for θ when φ=5° gives θ=10°, while 2φ, the follower-arm angle, is also 10°. Thus, sin 2φ for the instrument and sin θ for the true grade angle are exactly equal at θ=10° and very nearly so for other values of θ from 0° to 15° or 20°. Solid curve B of Figure 5 shows the improvement over curve A resulting from this increased value of T/WL. These two solid-line curves are directly comparable. As is clearly shown by the dashed-line plot of curve B to the ten-times expanded ordinate scale on the right of the drawing, the improvement over curve A is more than ten-fold. At 20°, for example, the error is only a little over 3 feet per mile instead of about 50, while at 6° or 7° it is less than 0.3 instead of nearly 6 feet per mile.

For the great majority of uses to which a surveying device of this type is put, this improvement is fully satisfactory. However, it is possible to increase the accuracy and range of the instrument still further by adjusting T, W, or L of the system so that the ratio T/WL has a value of approximately .0205 rather than .01745. This amounts to a choice of suspension constants such that the pendulum angle φ is slightly less than one-half of the grade angle θ. For this value of T/WL the torsion and the angle-doubling errors almost exactly offset each other. A proportionality constant K is then applied to the values of sin 2φ of this system, such as by proper choice of diameter for integrator friction wheel 50 or by applying a constant multiplier to the readings of indicator 52, so as to make K sin 2φ exactly equal to sin θ for some value of θ such as 10°. It is then found that K sin 2φ for this system is almost exactly equal to sin θ for all values of θ from 0° to 20°. In fact, the maximum error incurred by using the K sin 2φ of the instrument for integration in this range of grade angles is only about .02 foot per mile of traverse, which is truly negligible for all practical purposes. Curve C of Figure 5 showing this error as a function of grade angle is plotted on the ten-times vertically magnified ordinate scale on the right, on which the error from 0° to 20° is just barely discernible. It may be observed here also that the range of angles where the accuracy is good is much more than 0° to 20°, for the error does not exceed 1 foot per mile until the grade angle is more than 31°. As a matter of fact, values of the ratio T/WL ranging from about .0197 to about .0210 will be found to produce values of sin 2φ proportional to the true values of sin θ within 1 foot per mile from 0° to 20°. Above 20° these errors may in some cases exceed 1 foot per mile, but they are generally still negligible for most purposes.

In Figure 4 is shown an alternative embodiment of the invention, in which the angle of rotation of the mirror 30 is reduced, not by also reducing the deflection of the pendulum but by spacing the mirror away from the pendulum along one of the torsion fibers. Thus, by dividing the torsion fiber 24 into the two segments 60 and 61 and mounting the mirror 30 on a spindle between them, its angle of rotation will be a constant fraction of the angle of rotation of the pendulum 21. Upon choosing the relative lengths of segments 60 and 61 so that the angle of rotation of mirror 30 is exactly one-half of the grade angle θ for one arbitrarily selected grade angle such as θ=10°, it is found that the range of angles where the mirror angle is accurately one-half of the grade angle extends from 0° to well over 30° of grade angle. Since for a given angle of slope θ the angle φ of pendulum 21 relative to support 26 depends upon the ratio T/WL, so also do the relative lengths of segments 60 and 61 depend on T/WL. Thus, in the case of the pendulum system in which T/WL has the value .00244, it is found that the ratio of the length a of segment 61 to the total length of the segments 60 and 61, i. e., a+b, should be approximately .5694. This means, for example, that on a grade of 19.6° when the pendulum deflects 17.2°, the angle of rotation of mirror 30 is .5694×17.2°, giving a result of about 9.8°, which is exactly one-half of the grade angle. When this mirror angle of 9.8° has been doubled by the motion of follower arm 31, the follower-arm angle is then the same as the grade angle, or 19.6°. By spacing mirror 30 either further or closer to pendulum spindle 22 than the values given for a and b, the mirror angle may be made any desired fraction of the angle assumed by the pendulum. The curve of errors in feet per mile as a function of grade angle has been plotted in Figure 5 as curve D. Even on the right-hand expanded scale, the error does not become visible until the grade angle exceeds 25°. Specifically, the error remains less than .01 foot per mile until the grade angle exceeds about 27°, and even at an angle of 45° barely exceeds a value of .10 foot per mile.

Instead of dividing fiber 24 into two separated segments, the same result can be achieved by an arrangement for clamping the mirror 30 to the fiber at the proper spacing. Nor is it necessary that the two segments 60 and 61 of the divided fiber have the same stiffness. If desirable for any reason, two quite different fibers can be used so long as the combined effects of their lengths and torsion coefficients are to reduce the mirror angle to approximately one-half the corresponding grade angle.

While this invention has been described in terms of the foregoing specific embodiments, it is to be understood that these embodiments are for purposes of illustration only, and that the scope of the invention should not be considered as limited by the specific details thereof, but rather by the scope of the following claims.

We claim:

1. In an elevation meter of the type described, apparatus for producing a displacement proportional to the sine of a grade angle comprising, in combination, a gravity-responsive pendulum, a support for said pendulum adapted for transportation along a traverse and for orientation according to the grade angle encountered, a pair of torsion fibers suspending said pendulum from said support and exerting on said pendulum a torque such that the pendulum angle relative to said support is less than the corresponding grade angle, a rotatable follower arm pivoted concentrically with but independent of said pendulum, an integrator-adjusting member displaceable linearly perpendicular to the follower arm direction for zero grade angle, said member being coupled to said arm by a coupling adapted to make the displacement of said member proportional to the sine of the corresponding arm angle, and means for actuating said follower arm and said member including: a mirror on the pendulum axis, a light source unit and a photocell unit cooperating with said mirror, one of said units being fixed and the other mounted on said arm, whereby, in maintaining light from said source reflected by said mirror onto said photocell unit, said arm rotates through twice the mirror angle; said mirror being spaced away from said pendulum at a position along the length of one said fibers where the angle of rotation of said fiber is substantially one-half the corresponding grade angle.

2. In an elevation meter of the type described, apparatus for producing a displacement proportional to the sine of a grade angle comprising, in combination, a gravity-responsive pendulum, a support for said pendulum adapted for transportation along a traverse and for orientation according to the grade angles encountered, a pair of torsion fibers suspending said pendulum from said support and exerting on said pendulum a torque such that the pendulum angle of rotation relative to said support is less than the corresponding grade angle, a rotatable follower arm pivoted concentrically with but independent of said pendulum, an integrator-adjusting member displaceable linearly perpendicular to the follower arm direction for zero grade angle, said member being coupled to said arm by a coupling adapted to make the displacement of said member proportional to the sine of the corresponding arm angle, and means for actuating said arm and said member including: a mirror on the pendulum axis, a light source unit and a photocell unit cooperating with said mirror, one of said units being fixed and the other mounted on said arm, whereby, in maintaining light from said source and reflected by said mirror directed onto said photocell unit, said arm rotates through twice the mirror angle; one of said torsion fibers being divided into two portions at a point where the angle of rotation of said fiber is substantially one-half the corresponding grade angle, and said mirror being located substantially at said point and connected between said two portions.

DANIEL SILVERMAN.
JOSEPH D. EISLER.
JULIAN F. EVANS.

REFERENCES CITED

The following references are of record in the file of this patent:

UNITED STATES PATENTS

| Number | Name | Date |
| --- | --- | --- |
| 2,362,616 | Cloud | Nov. 14, 1944 |
| Re. 22,919 | McNatt | Sept. 23, 1947 |